United States Patent [19]
Tisbo et al.

[11] Patent Number: 5,915,307
[45] Date of Patent: Jun. 29, 1999

[54] SPORTS SHELF

[75] Inventors: Thomas A. Tisbo, Barrington Hills; Torrence C. Anderson, Aurora; Michael G. Uffner, Naperville, all of Ill.

[73] Assignee: Suncast Corporation, Batavia, Ill.

[21] Appl. No.: 09/015,438

[22] Filed: Jan. 29, 1998

[51] Int. Cl.[6] ........................................... A47B 5/00
[52] U.S. Cl. ........................................ 108/152; 211/90.01
[58] Field of Search .............................. 211/88.01, 90.01, 211/134, 135, 153; 108/152, 161

[56] References Cited

U.S. PATENT DOCUMENTS

| | | | |
|---|---|---|---|
| D. 191,790 | 11/1961 | Schaefer | D34/5 |
| D. 198,349 | 6/1964 | Saunders | D80/10 |
| D. 203,513 | 1/1966 | Warren | D34/5 |
| D. 237,231 | 10/1975 | Wells | D20/2 |
| D. 240,421 | 7/1976 | Rose | D6/4 |
| D. 261,571 | 11/1981 | Hanson | D3/38 |
| D. 283,472 | 4/1986 | Wattles | D6/463 |
| D. 283,568 | 4/1986 | Valley | D6/429 |
| D. 290,201 | 6/1987 | Wilder | D6/464 |
| D. 303,600 | 9/1989 | Thompson et al. | D6/552 |
| D. 309,226 | 7/1990 | Wilcox | D6/552 |
| D. 309,998 | 8/1990 | Sumrell et al. | D6/567 |
| D. 323,591 | 2/1992 | Stravitz | D6/437 |
| D. 385,140 | 10/1997 | Whitehead et al. | D6/574 |
| D. 390,377 | 2/1998 | Whitehead et al. | D6/449 |

(List continued on next page.)

FOREIGN PATENT DOCUMENTS

| | | |
|---|---|---|
| 501564 | 4/1954 | Canada . |
| 1272708 | 8/1961 | France . |
| 1273324 | 8/1961 | France . |
| 1274556 | 9/1961 | France . |
| 1467884 | 12/1966 | France . |
| 2609790 | 9/1976 | Germany . |
| 096105 | 2/1988 | Taiwan . |
| 15722 | 9/1909 | United Kingdom . |
| 253810 | 6/1926 | United Kingdom . |
| 261537 | 11/1926 | United Kingdom . |
| 627398 | 8/1949 | United Kingdom . |
| 929049 | 6/1963 | United Kingdom ................ 211/153 |
| 2156199 | 10/1985 | United Kingdom . |
| PCT/US89/ 04376 | 10/1989 | WIPO . |

OTHER PUBLICATIONS

World of My Own Catalog, p. 375, Twin–Size Basketball Headboard, item j; ball holder, item P.
Rubbermaid catalog, Oct. 6, 1996, bath organization.
The great kids company catalog, my own space, toy box and personalized kid's book case, and p. 31, See–All Storage.
Lilly's Kids catalog, 1994, 1995, hung up on sports wooden peg racks.
Furniture design & Manufacturing catalog, Oct. 1996, fdm reader'choice, keep media organized multimedia storage from titus, inc.
lvc catalog, 1995, item 2830 ja personalized baseball rack.

*Primary Examiner*—Peter M. Cuomo
*Assistant Examiner*—Gerold A. Anderson
*Attorney, Agent, or Firm*—Welsh & Katz, Ltd.

[57] ABSTRACT

An easy to assemble sports shelf unit with a snap together construction is provided to support and display a variety of items, such as: trophies, awards, sports gear, pictures, and memorabilia. The attractive sports shelf unit has a contoured wall member to which is connected to a special snap-together shelf assembly with upper and lower shelves. The shelf assembly is supported and connected to brackets and an elliptical sloping support member which extends forwardly from the lower portion of the wall member. The elliptical sloping support member provides a lower display area to display logos, team emblems or other sports indicia. The upper portion of the wall member has an offset circular display area to display other sports indicia. Pegs can be connected to lower portion of the wall member, below the shelf assembly, to hang sports gear, jerseys, hats, and other clothing.

20 Claims, 5 Drawing Sheets

U.S. PATENT DOCUMENTS

| | | | |
|---|---|---|---|
| D. 390,378 | 2/1998 | Whitehead et al. | D6/449 |
| D. 393,961 | 5/1998 | Whitehead et al. | D6/464 |
| 466,608 | 1/1892 | Landis . | |
| 797,614 | 8/1905 | Schipkowsky . | |
| 860,278 | 7/1907 | Botkin . | |
| 913,228 | 2/1909 | McCarthy . | |
| 929,519 | 7/1909 | True . | |
| 1,733,487 | 10/1929 | Hackley . | |
| 1,869,226 | 7/1932 | Subick . | |
| 2,014,745 | 9/1935 | Regli | 211/90.01 |
| 2,060,760 | 11/1936 | Keil | 211/87 |
| 2,090,108 | 8/1937 | Cicero | 211/35 |
| 2,122,336 | 6/1938 | Berry | 211/88 |
| 2,271,784 | 2/1942 | Tritt | 248/220 |
| 2,633,998 | 4/1953 | Derman | 211/104 |
| 2,767,854 | 10/1956 | Barrett | 211/13 |
| 2,885,090 | 5/1959 | Forman et al. | 211/175 |
| 2,930,486 | 3/1960 | Hoover | 211/44 |
| 2,950,003 | 8/1960 | Simmons et al. | 206/75 |
| 2,972,417 | 2/1961 | Smith | 211/71 |
| 3,163,132 | 12/1964 | Nelson | 108/152 |
| 3,220,363 | 11/1965 | Gingher | 108/144 |
| 3,565,020 | 2/1971 | Shier | 108/152 |
| 3,650,407 | 3/1972 | Benham, Jr. | 211/14 |
| 3,669,395 | 6/1972 | Gehrke | 248/235 |
| 3,698,563 | 10/1972 | Gordon et al. | 211/13 |
| 3,788,241 | 1/1974 | Ravreby | 108/6 |
| 3,869,137 | 3/1975 | Byrom | 280/47.19 |
| 3,888,353 | 6/1975 | Leifheit | 211/37 |
| 3,997,060 | 12/1976 | Kunin | 211/126 |
| 4,002,241 | 1/1977 | Parrilla, Sr. | 211/88 |
| 4,049,126 | 9/1977 | Halverson | 211/104 |
| 4,154,442 | 5/1979 | Trubody et al. | 273/29 |
| 4,162,013 | 7/1979 | Tucker | 211/43 |
| 4,178,844 | 12/1979 | Ward et al. | 99/449 |
| 4,188,890 | 2/1980 | deVillers | 108/30 |
| 4,193,495 | 3/1980 | Keeley | 206/315 |
| 4,277,710 | 7/1981 | Laub | 280/47 |
| 4,315,633 | 2/1982 | Boeddeker et al. | 280/79.3 |
| 4,376,521 | 3/1983 | Walters | 248/206 |
| 4,561,547 | 12/1985 | Estwanik, III | 211/14 |
| 4,583,647 | 4/1986 | Schinzing | 211/60.1 |
| 4,629,065 | 12/1986 | Braaten | 206/315.1 |
| 4,633,789 | 1/1987 | Kortering et al. | 108/152 |
| 4,643,317 | 2/1987 | Wilkinson et al. | 211/14 |
| 4,674,967 | 6/1987 | Oseka | 425/110 |
| 4,676,539 | 6/1987 | Potocnjak | 294/67.4 |
| 4,678,087 | 7/1987 | York | 211/70.5 |
| 4,708,310 | 11/1987 | Smith | 248/220 |
| 4,776,650 | 10/1988 | Ferenzi | 312/245 |
| 4,854,456 | 8/1989 | Lee | 211/14 |
| 4,863,082 | 9/1989 | Evans et al. | 244/42 |
| 4,871,074 | 10/1989 | Bryson et al. | 211/13 |
| 4,936,467 | 6/1990 | Bobeczko | 211/14 |
| 5,014,948 | 5/1991 | Asaro et al. | 248/215 |
| 5,188,246 | 2/1993 | Maxworthy | 211/153 |
| 5,203,462 | 4/1993 | Brooks | 211/14 |
| 5,253,837 | 10/1993 | Loux | 248/250 |
| 5,294,005 | 3/1994 | Hedges | 211/13 |
| 5,325,973 | 7/1994 | Reedy | 211/18 |
| 5,413,228 | 5/1995 | Le Clerc | 211/13 |
| 5,706,737 | 1/1998 | Whitehead et al. | 108/42 |

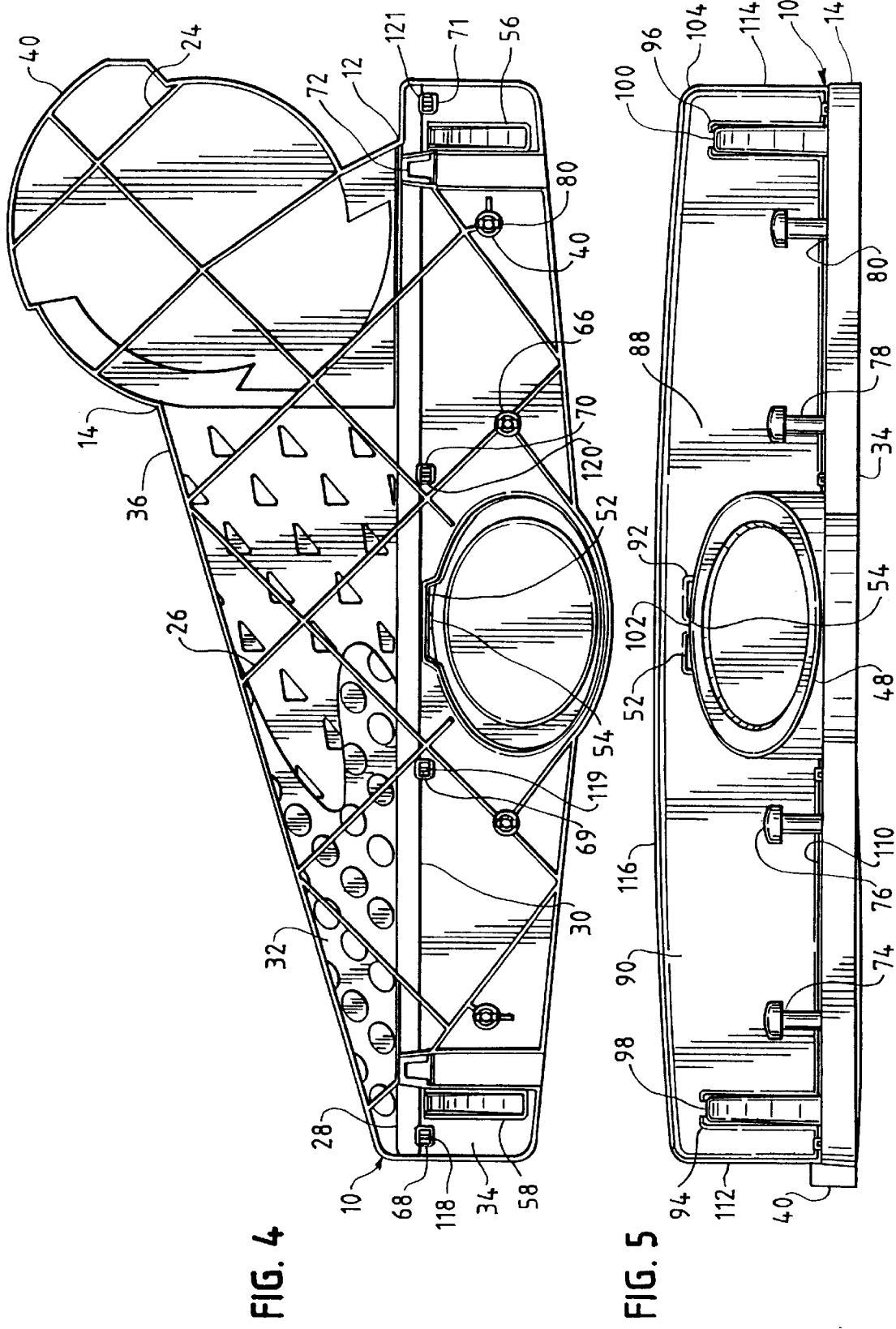

FIG. 6
FIG. 7
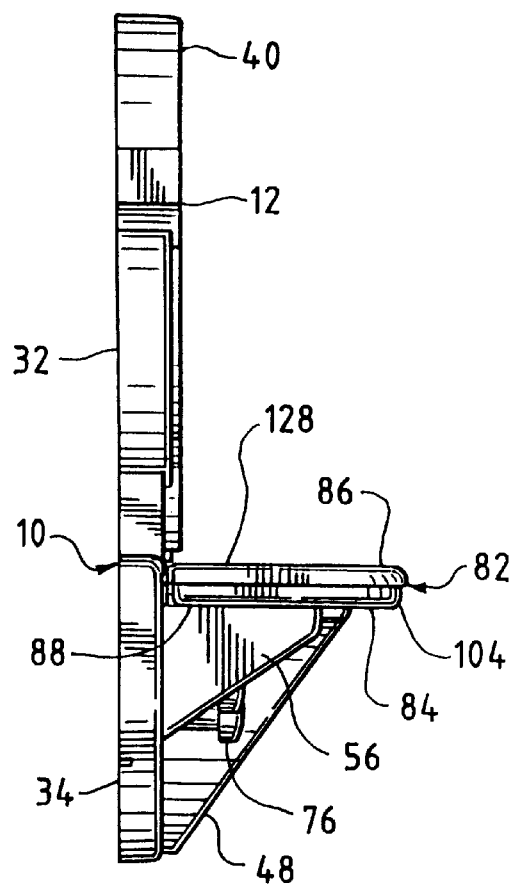
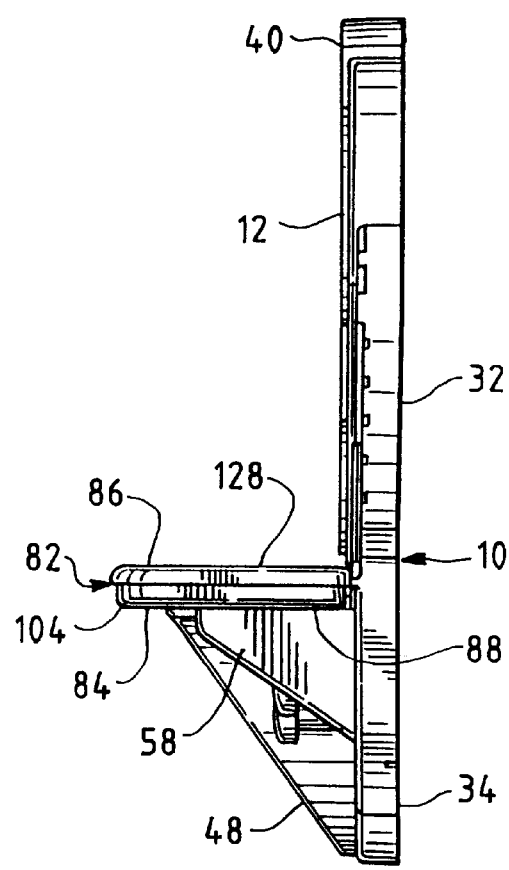

SPORTS SHELF

BACKGROUND OF THE INVENTION

This invention pertains to shelves and, more particularly, to a display shelf.

Over the years a variety of shelving units, racks and display cases have been build. Many of these shelving units, racks and display cases have been constructed of metal, such as steel, iron, or aluminum. Many other shelving units, racks, and display cases have been fabricated of wood, laminated particle board, and other synthetic materials. Some of the shelving units and display cases have been built with glass windows, glass panels, and/or glass shelves. Shelves constructed of aluminum, laminated particle board, and some synthetic materials have a tendency to warp and bow from use due to loads of the items stored on the shelf.

Conventional shelving units, racks and display cases are often cumbersome and difficult to assemble. Furthermore, conventional shelving units, racks and display cases often requires numerous screws, bolts, nuts, or other fasteners, for assembly which necessitate the use of screwdrivers, wenches, and other tools.

It is, therefore, desirable to provide an improved shelf unit which overcomes most, if not all of the preceding difficulties.

SUMMARY OF THE INVENTION

An improved shelf unit is provided to hold and display items, such as sports items and other articles. The easy-to-assemble shelf unit is especially attractive for use in children's bedroom, recreation rooms, and family rooms to display pictures, trophies and sports memorabilia, such as: trading cards, autograph balls, sports books, etc. Advantageously, the user-friendly shelf unit has a snap-together construction and is preferably molded of impact-resistant plastic to increase longevity and wear as well as to prevent dents, nicks, splinters, rust and other damage. Desirably, the sturdy shelf unit is light weight, economical and reliable.

The novel shelf unit has a special multi-piece shelf assembly with an upper shelf and a lower shelf which snap fit together and are secured to and cantilevered from a wall member, preferably without the use of bolts, screws, nails and other fasteners and preferably without the need for screwdrivers, wrenches, hammers and other tools. To this end, the shelf assembly can have snap-fitting connectors to snap fit and connect the shelves together. One of the shelves can have a set of protuberances and the other shelf can have openings which matingly receive, wedge and engage the complementary protuberances to snap fit and securely couple the shelves. The lower shelf can comprise a platform with a peripheral lip. The upper shelf can comprise an overhanging tray with a peripheral groove which firmly receives and snap fitting engages the peripheral lip of the lower shelf.

In the preferred form, the upper portion of the wall member has a display area which is positioned above the shelf assembly. The lower portion of the wall member can have a sloping support member which engages and helps support the shelf assembly. Preferably, the sloping support member comprises a lower display area which is positioned below the shelf assembly. The shelf unit can also have brackets which extend forwardly of the lower portion of the wall member to provide auxiliary support for the shelf assembly. In the illustrated embodiment, the shelf unit has a series of pegs which provide hanger hooks that are secured to and extend forwardly of the wall member at a location below the shelf assembly to hang items, such as jerseys, caps, jackets, sports equipment, etc. Preferably, the pegs snap or press fit into the wall member. The shelf unit can be produced and made available in different colors with favorite team logos, college insignias, and decals for personalizing, as well as illustrate various sports, such as basketballs, baseball, football, hockey, soccer, etc. The shelf unit completely snaps together; no tools are required. The wall member can have guide slots or openings for mounting on a wall.

The sloping support member, can comprise an elliptical support member which is positioned at the center of the lower portion of the wall member, underneath the shelf assembly. The support member can slope back to the wall member. Advantageously, the sloping support member services a dual function: (1) to support the shelf assembly, and (2) define a recessed area to display a logo, decal, or other sports indicia. The lower display area is also positioned at an angle of inclination to further distinguish viewing of the lower display area from the upper display area.

The upper shelf, which forms the top of the shelf assembly, can be undercut around its periphery to provide a recessed groove and a downwardly extending lip. The lower shelf, which forms the bottom of the shelf assembly, can have a raised bead or lip which provides a peripheral flange that snap fits into the recessed groove of the upper shelf.

In the illustrative embodiment, the lower shelf can have T-shaped interlocking members which engage, insert and glove into complementary T-shaped slots on the front of the wall member in order to help properly align and secure the shelf assembly to the wall member. The lower shelf can also have snaps, such as tongues, which engage and snap into holes in the brackets and support member to help secure the shelf assembly to the brackets and support member.

A more detailed explanation of the invention is provided in the following description and appended claims taken in conjunction with the accompanying drawings.

BRIEF DESCRIPTION OF THE DRAWINGS

FIG. 4 is a back view of the shelf unit;

FIG. 5 is a bottom view of the shelf unit;

FIG. 6 is a left side view of the shelf unit;

FIG. 7 is a right side view of the shelf unit; and

DETAILED DESCRIPTION OF THE PREFERRED EMBODIMENT

Figure 1:
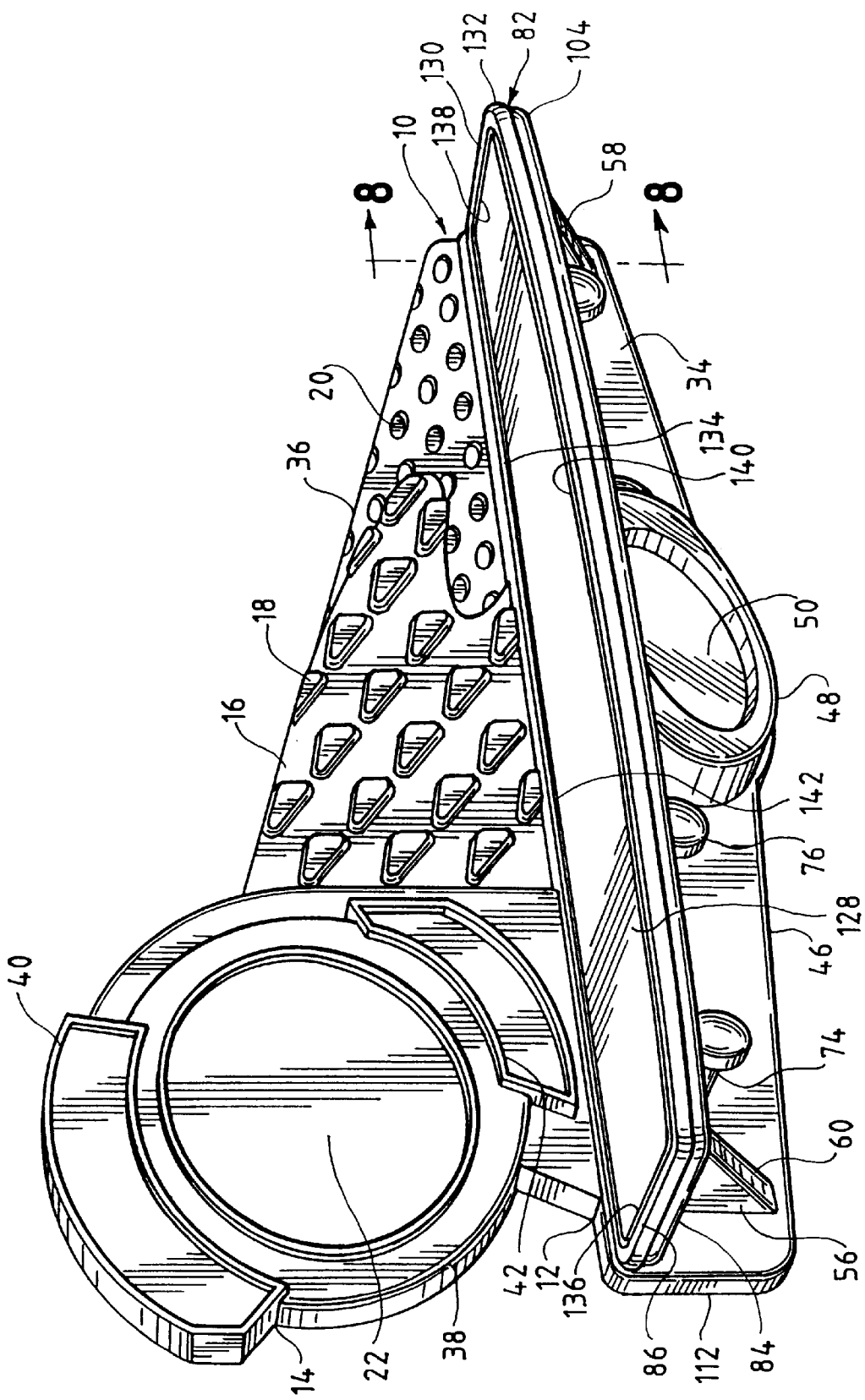
FIG. 1 is a perspective view of a shelf unit which provides a sports shelf in accordance with principles of the present invention.
Figure 2:
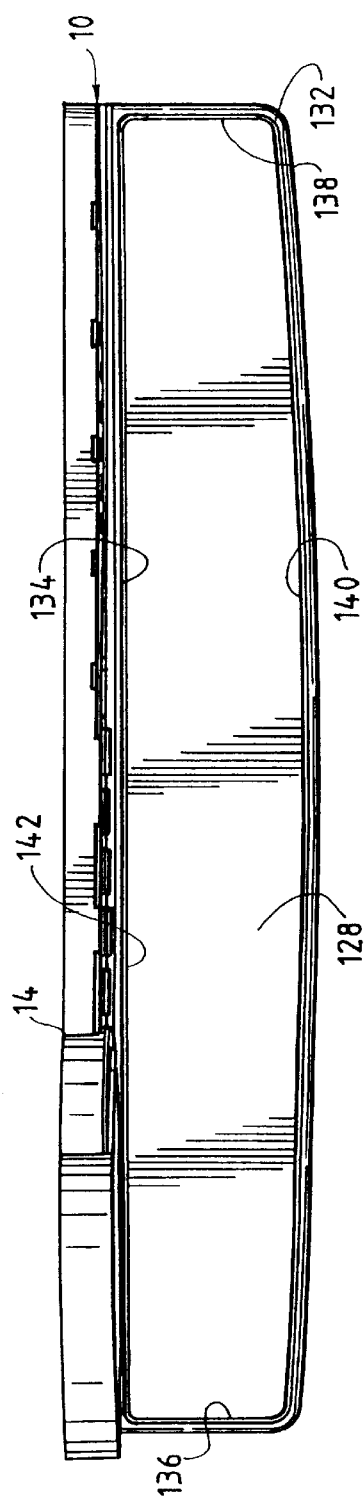
FIG. 2 is a top view of the shelf unit.

A sports shelf unit 10 (FIG. 1), which is also sometimes referred to as a Licensed Shelf, sports shelf, sports utility shelf, or a shelving unit, is provided to hold and display items, such as sports items and other articles. The sports shelf unit can be molded of impact-resistant plastic, such as high-impact resin, polyethylene, polypropylene, polyurethane, graphite-impregnated plastic, or other plastic.

The sports shelf unit has an upright plastic wall member 12 (FIG. 1) with a peripheral wall-engaging flange 14 for mounting against a wall. The upright wall member has a pigmented contoured front surface 16 which provides: a front portion with an array of forwardly extending raised portions 18; indented, depressed recessed portions 20, and three dimensional molded-in graphics 22 with colors of a desired sports team, such as for basketball, football, hockey, baseball, soccer, etc.

The back portion 24 (FIG. 4) of the upright wall member has a matrix of plastic flanges 26 which provide a lattice intrastructure to support, strength and rigidify the wall member and shelf unit. The upright wall member also has a substantially horizontal rearwardly extending undercut portion 28 which provides a shelf-receiving groove 30 comprising upper and lower recessed sections. An upper wall portion 32 of the wall member is positioned above the shelf-receiving groove. A lower wall portion 34 of the wall member is positioned below the shelf-receiving groove.

The upper wall portion of the upright wall member has a triangular support section 36 (FIG. 3) and a forwardly extending curved upper display member 38 with upper and lower curved arcuate display sections 40 and 42 and a recessed circular upper display area 44 and section to display sports indicia, such as: sports emblems, sport team logos, team names, illustrations of athletes, portraits of sports figures, and graphical displays of sports subjects.

Figure 3:
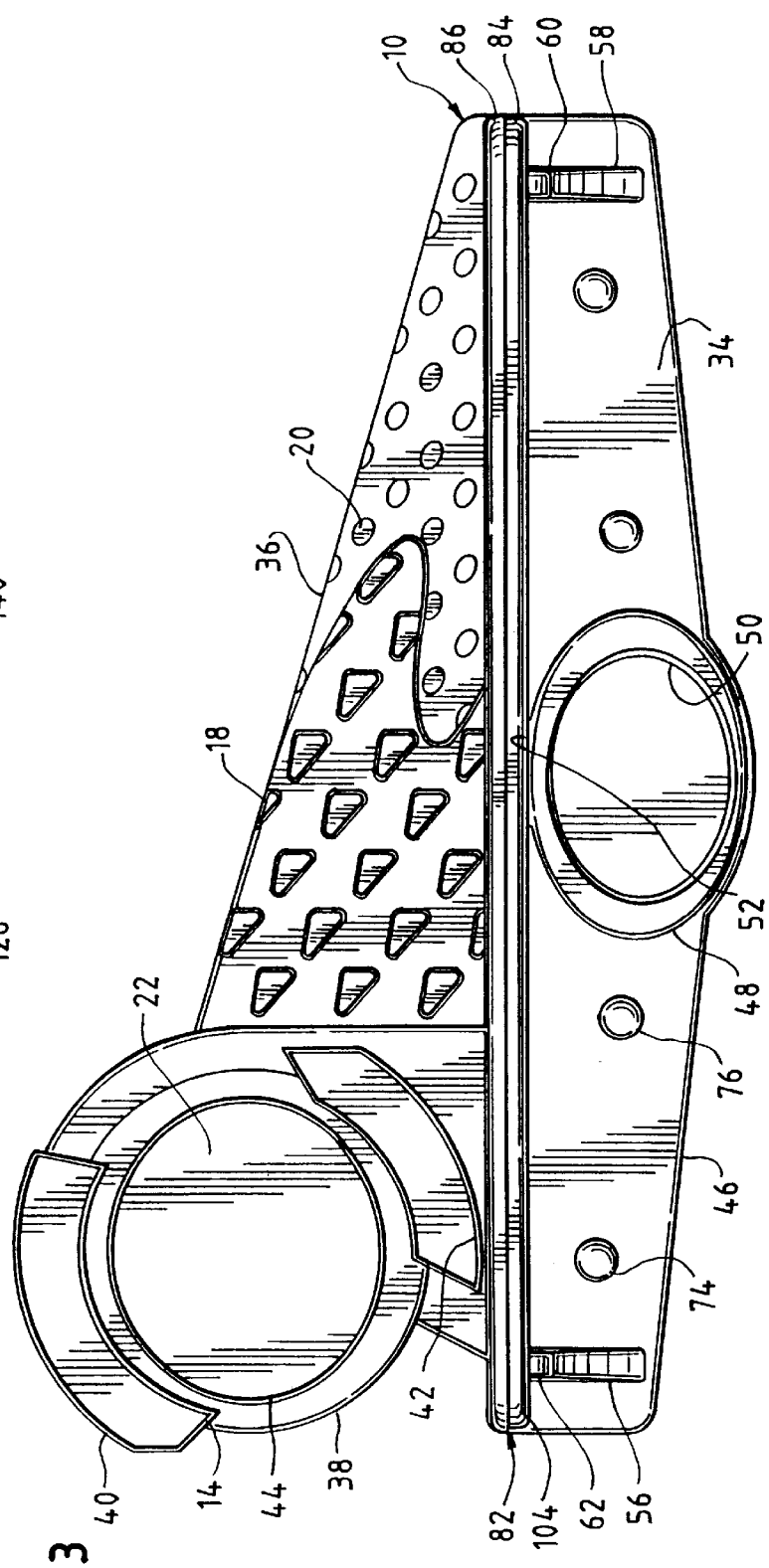
FIG. 3 is a front view of the shelf unit.

The lower wall portion of the upright wall member has a downwardly converging bottom section 46 (FIG. 3) and an elliptical central shelf-supporting member 48 which extends and slopes upwardly and forwardly. The elliptical central shelf-supporting member 48 which extends and slopes upwardly and forwardly. The elliptical central shelf-supporting member has a recessed elliptical lower display area 50 and section, which is laterally offset from the circular upper display area 44, to display other sports indicia. The elliptical central shelf-supporting member has an upper raised ledge 52 (FIGS. 3, 4 and 5). The upper raised ledge can have a central inverted T-shaped slot 54 (FIGS. 4 and 5).

Figure 8:
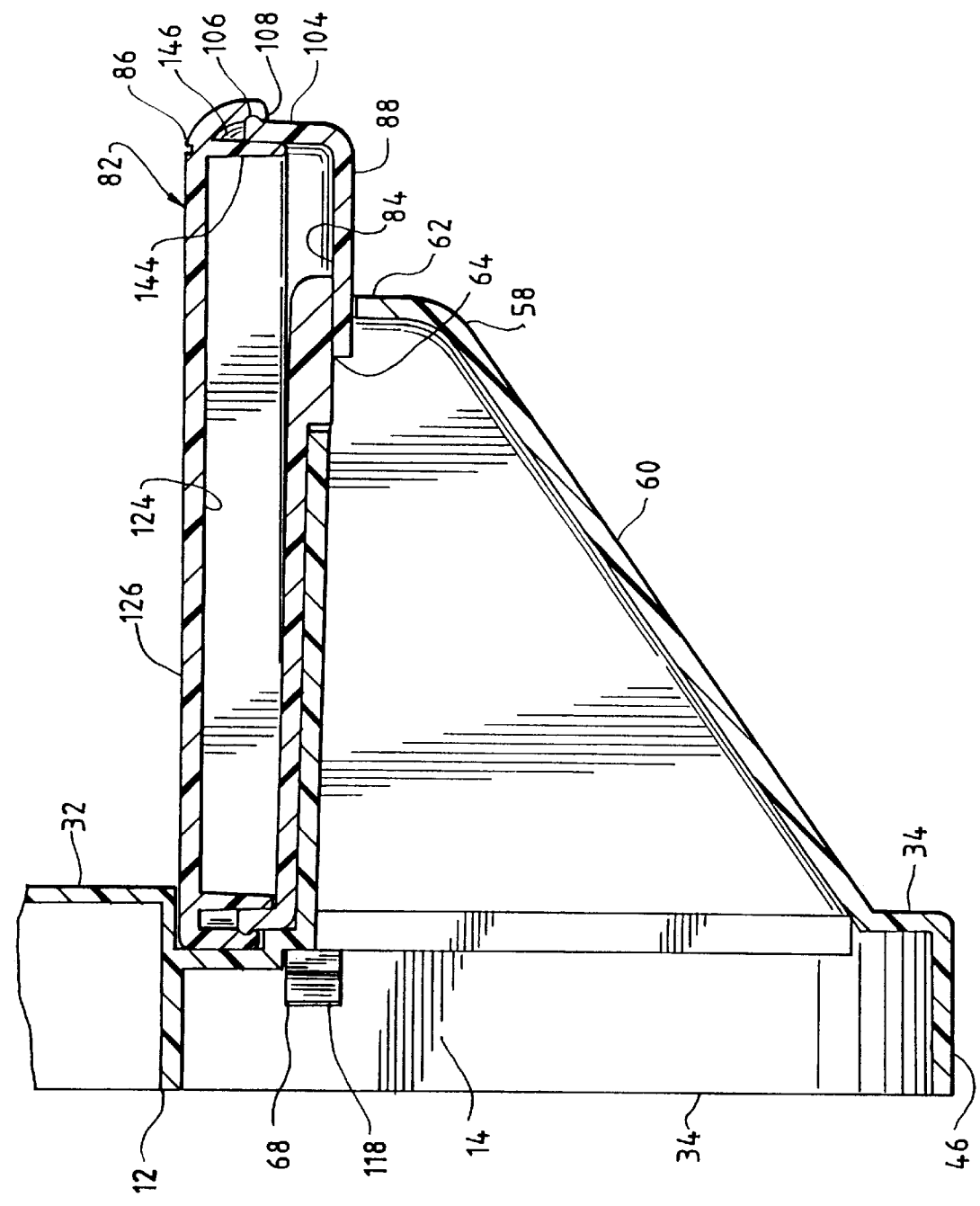
FIG. 8 is an enlarged cross-sectional view of a bracket and shelf assembly of the shelf unit taken substantially along line 8—8 of FIG. 1.

The elliptical shelf-supporting member is positioned between plastic shelf-supporting brackets 56 and 58 (FIGS. 1 and 3). The brackets are generally triangular shaped and extend integrally forwardly from the front surface of the lower portion of the wall member. The brackets have inclined sloped front sections 60 (FIGS. 1 and 8) and have upper front corners 62 (FIGS. 3 and 8) with inverted T-shaped bracket-slots 64 (FIG. 8).

The lower wall portion can have a set, series, or array of: peg holes 66 (FIG. 4), finger-receiving apertures 68–71, and elongated openings 72. The peg holes can be circular and positioned between the elliptical shelf-supporting member and the brackets generally about the horizontal centerline of the elliptical shelf-supporting member. The finger-receiving apertures can comprises squares holes, rectangular openings, or slots and can be positioned in proximity to the bottom of the shelf-receiving groove. The laterally outer end finger-receiving apertures 68 and 71 can be positioned laterally outwardly of the brackets. The intermediate finger-receiving apertures 69 and 70 can be positioned laterally inwardly of the brackets in proximity to the elliptical shelf-supporting member. The elongated openings 72 can comprise T-shaped mounting holes and can be located laterally inwardly of the brackets.

A set, series or array of pegs 74 (FIG. 5) are inserted and positioned in the peg holes so as to be securely connected and cantilevered from the lower wall portion of the upright wall member at locations between the brackets and the elliptical shelf-supporting member to hang and support sports items, such as: sport jerseys, caps, hats, baseball gloves, jackets, sports uniforms, sports equipment, sports apparel, and other clothing. Preferably, the pegs comprise plastic pegs with enlarged front end portions providing knobs 76 and hollow tubular body portions 78. The rearward free ends of the pegs, which are opposite the knobs, preferably comprise flexible split ends 80 (FIGS. 4 and 5) which snap fit and wedge in the peg holes.

The sports shelf unit has a plastic shelf assembly 82 (FIGS. 1, 3, and 6–8) which comprises a snap-fitting multi-piece shelf. The shelf assembly has an underlying plastic platform 84 (FIGS. 1, 3, 6 and 7) that provides a lower shelf portion (lower shelf) and has an overhanging overlying plastic try 86 that provides an upper shelf (upper shelf portion).

The bottom 88 (FIGS. 5, 6 and 7) of the lower shelf portion of the shelf assembly is supported and engaged by the top of the shelf-supporting brackets and the upper raised ledge of the elliptical shelf-supporting member. The bottom of the lower shelf portion provides a horizontal base section 90 (FIG. 5) and has a central, upwardly recessed channel 92 (FIG. 5) which diverges rearwardly and provides an intermediate groove and a central recessed section that slidably fits upon, wedges and engages the upper raised ledge of the elliptical shelf-supporting member. The bottom of the lower shelf portion also has upwardly recessed end channels 94 and 96 (FIG. 5) which diverge rearwardly and provide end grooves and recessed bracket-engaging sections that slidably fit upon, wedge and engage the top and upper front corners of the brackets. Rearwardly extending end tongues 98 and 100 (FIG. 5) are positioned in the end grooves (upwardly recessed end channels) to fit within and interlockingly engage the inverted T-shaped bracket-slots of the upper front corners of the brackets so as to snap fit and securely connect the lower shelf portion to the brackets. A central rearwardly extending tongue 102 (FIG. 5) is positioned in the intermediate groove (central upwardly recessed channel) to fit within and interlockingly engage the central inverted T-shaped slot of the raised ledge of the elliptical shelf-supporting member so as to snap fit and securely connect the lower shelf portion to the raised ledge of the shelf-supporting member.

Extending upwardly from the bottom of the lower shelf portion of the shelf assembly is an upright peripheral flange 104 (FIGS. 1, 6 and 7). The upright peripheral flange has an overhanging beaded upper-edge comprising a peripheral lip 106 (FIG. 8). The peripheral lip cooperates with the peripheral flange to provide a peripheral snap-fitting connector 108 (FIG. 8). The upright peripheral lip has a back section 110 (FIG. 5), side sections 112 and 114 which extend forwardly from the back section, and a slightly convex front section 116 which extends between and is integrally connected to the side sections. The back section of the lower shelf portion fits within the lower section of the shelf-receiving groove of the upright wall member. A matrix of flanges which comprise a lattice intrastructure can extend upwardly from the bottom of the lower shelf portion for enhanced strength support, and rigidity.

Pairs of complementary hook-shaped plastic fingers 118–121 (FIG. 4) extend rearwardly and integrally from the back section of the upright peripheral flange of the lower shelf portion. Hooked shaped fingers 118 and 121 are positioned in proximity to the side sections of the upright peripheral lip of the lower shelf portion. Hooked-shaped fingers 119 and 120 are positioned laterally outwardly of the raised ledge of the elliptical shelf-supporting member. Preferably, the hooked-shaped fingers comprise flexible, laterally biased hooked-shaped fingers which diverge forwardly. The fingers are normally biased and are urged laterally outwardly. The fingers can be squeezed, pinched or otherwise moved laterally inwardly toward a rearwardly converging position to interlockingly engage and be positioned within the finger-receiving apertures of the lower wall portion of the upright wall member in order to snap fit, wedge and securely connect the lower shelf portion to the lower wall portion to the upright wall member.

The upper shelf portion of the shelf assembly abuts against, engages, is positioned above, and extend over the lower shelf portion of the shelf assembly. The upper shelf portion has an underside 124 (FIG. 8) and a top 126. The top can comprise a recessed horizontal planar or flat section 128 (FIG. 1) to support and display sports paraphernalia, such as: trophies, sports pictures, autograph sports items, golf balls, baseballs, soccer balls, footballs, basketballs, etc.

The top of the upper shelf section preferably displays the sports paraphernalia at locations between the circular upper display area and the elliptical lower display area. The upper shelf portion also has a raised peripheral edge 130 (FIG. 1) which peripherally surrounds and extends to a height above the recessed horizontal planar, flat section of the upper shelf portion. A curved convex peripheral skirt 132 (FIG. 1) depends and extends integrally downwardly from the raised peripheral edge of the upper shelf portion. The peripheral skirt has: a back 134, sides 136 and 138 which extend forwardly from the back, and a slightly convex front 140 which extends between and is integrally connected to the sides of the skirt. The lower shelf portion has a rearward section 142, which includes the back, that can be securely positioned and wedged in and cantilevered from the upper section of shelf-receiving grove of the upright wall member.

As shown in FIG. 8, the upper shelf portion can have an inner flange 144 which extends and depends integrally downwardly from the underside of the lower shelf portion. The inner flange is spaced laterally inwardly from and cooperates with the peripheral skirt to define a downwardly facing peripheral groove 146 which provides a peripheral socket that securely receives and interlockingly engages the snap-fitting connector (peripheral lip and flange) of the lower shelf portion so as to firmly connect and snap-fit the upper and lower shelf portions together to assembly, form and provide a sturdy shelf assembly.

Among the many advantages of the shelf unit of this invention are:

1. Easy to assemble.
2. Snap together construction.
3. Superior display of sports indicia.
4. Outstanding performance.
5. Ease of decoration with custom colors and personalizing.
6. Prevents splinters, dents and rust.
7. Excellent contoured graphics.
8. Attractive.
9. Strong.
10. Safe.
11. Dependable.
12. User-friendly.
13. Convenient.
14. Durable.
15. Portable.
16. Light-weight.
17. Sturdy.
18. Simple to use.
19. Efficient.
20. Versatile.
21. Economical.
22. Effective.

Although embodiments of the invention have shown and described, it is to be understood that various modifications and substitutions, as well as rearrangements of parts and components, can be made by those skilled in the art without departing from the novel spirit and scope of this invention.

What is claimed is:

1. A shelf unit, comprising:
   a wall member; and
   a shelf assembly secured to and cantilevered from said wall member in the absence of bolts, screws, nails, and other fasteners; and
   said shelf assembly comprising an upper shelf and a lower shelf in snap-fitting engagement with each other in the absence of bolts, screws, nails, and other fasteners.

2. A shelf unit in accordance with claim 1 wherein said wall member comprises a plastic wall member with an upper wall member portion positioned above said shelf assembly and a lower wall member portion positioned below said shelf assembly.

3. A shelf unit in accordance with claim 2 wherein said upper wall member portion comprises an upper display area spaced above said shelf assembly.

4. A shelf unit in accordance with claim 2 wherein said lower wall member portion comprises a sloping support member for engaging said lower shelf to help support said shelf assembly, and said sloping support member comprises a lower display area positioned below said shelf assembly.

5. A shelf unit in accordance with claim 1 including brackets for supporting said shelf assembly.

6. A shelf unit in accordance with claim 1 wherein said upper shelf comprises an overhanging plastic tray.

7. A shelf unit in accordance with claim 1 including a series of pegs securely extending from said wall member at a location below said shelf assembly for hanging items.

8. A shelf unit in accordance with claim 1 wherein one of said shelf portions comprises a set of protuberances and the other of said shelf portions defines openings for wedgingly receiving and snap-fittingly engaging said protuberances.

9. A shelf unit in accordance with claim 1 wherein said lower shelf portion comprises a plastic platform for supporting said upper shelf portion and said shelf assembly comprises complementary snap-fitting connectors for connecting said upper and lower shelf portions.

10. A shelf unit comprising:
    a wall member; and
    a shelf assembly secured to and cantilevered from said wall member in the absence of bolts, screws, nails, and other fasteners,
    said shelf assembly comprising an upper shelf and a lower shelf in snap-fitting engagement with each other in the absence of bolts, screws, nails, and other fasteners, wherein
    said lower shelf has a peripheral snap-fitting connector comprising an upright peripheral flange with a peripheral lip, and wherein
    said upper shelf has a peripheral skirt and an inner flange, said inner flange being spaced laterally inwardly of said peripheral skirt and cooperating with said peripheral skirt to define a downwardly facing peripheral groove therebetween for securely receiving said snap-fitting connector of said lower shelf to connect said upper and lower shelves in snap-fitting engagement with each other.

11. A sports shelf unit for holding an displaying sports items, comprising:
an upright plastic wall member for mounting against a wall, said upright plastic wall member defining a substantially horizontal undercut portion providing a shelf-receiving groove, said upright plastic wall member comprising an upper wall portion positioned above said shelf-receiving groove and a lower wall portion positioned below said shelf-receiving groove;
said upper wall portion comprising a forwardly extending upper display member providing an upper display area for displaying sports indicia;
plastic shelf-supporting brackets comprising triangular braces extending integrally forwardly from said lower wall portion;
said lower wall portion comprising a central shelf-supporting member sloping upwardly and forwardly, said central shelf-supporting member being positioned between said shelf-supporting brackets and comprising a lower display area for displaying other sports indicia;
an array of plastic pegs cantilevered from and secured to said lower wall portion at locations between said brackets and said lower display area for hanging and supporting sports items;
a plastic shelf assembly comprising
a plastic platform comprising a lower shelf portion with a bottom supported by and engaging said brackets and said central shelf-supporting member, said lower shelf portion having an upright peripheral flange extending upwardly from said bottom, said lower shelf portion having an upper edge comprising a peripheral lip, said lip cooperating with said upright peripheral flange to provide a peripheral snap-fitting connector, said upright peripheral flange having a back section, side sections extending forwardly from said back section, and a front section extending between and integrally connecting said side sections; and
an overhanging plastic tray providing an upper shelf portion abutting against said lower shelf portion, said tray positioned above, engaging and extending over said platform providing said lower shelf portion, said tray having an underside and a top comprising a recessed substantially horizontal planar section for supporting and displaying sports paraphernalia at a location between said upper and lower display areas, said top having a raised peripheral edge peripherally surrounding and extending to a height above said recessed horizontal planar section, said tray comprising a peripheral skirt depending integrally downwardly from said raised peripheral edge, said peripheral skirt having a back, sides extending forwardly from said back, and a front extending between and integrally connecting said sides, said tray having a rearward section including said back securely positioned in and cantilevered from said shelf-receiving groove of said upright plastic wall member, said upper shelf portion having an inner flange depending integrally downwardly from the underside of said tray, said inner flange being spaced laterally inwardly from and cooperating with said peripheral skirt to define a downwardly facing peripheral groove providing a peripheral socket for securely receiving and interlockingly engaging said peripheral snap-fitting connector of said lower shelf portion to firmly connect and snap-fit said upper and lower shelf portions together to provide a shelf assembly.

12. A sports shelf unit in accordance with claim 11 wherein said shelf-supporting member comprises an elliptical shelf-supporting member.

13. A sports shelf unit in accordance with claim 12 wherein:
said elliptical shelf-supporting member has an upper raised ledge providing a top section for abuttingly engaging and supporting said plastic platform comprising said lower shelf portion, and said upper raised ledge defines a central inverted T-shaped slot; and
said bottom of said lower shelf portion defines a central recessed rearwardly diverging channel for sliding upon and wedgingly engaging said upper raised ledge of said elliptical shelf-supporting member, said bottom of said lower shelf portion having a central rearward extending tongue positioned in said central recessed rearwardly diverging channel for interlockingly engaging said central inverted T-shaped slot to snap fit and connect said plastic platform comprising said lower shelf portion to said upper raised ledge of said elliptical shelf-support member.

14. A sports shelf unit in accordance with claim 11 wherein said upper display member comprises a substantially circular display portion.

15. A sports shelf unit in accordance with claim 11 wherein said upper display area is laterally offset from said lower display area.

16. A sports shelf unit in accordance with claim 11 wherein:
said plastic pegs each have an enlarged front end portion comprising a knob, and a hollow tubular body portion extending integrally rearwardly from said knob, said hollow body portion having a flexible split end positioned opposite of said knob; and
said lower wall portion defines holes below said shelf assembly for receiving said split ends of said pegs.

17. A sports shelf unit in accordance with claim 11 wherein said sports paraphernalia comprises at least one item selected from the group consisting of: a trophy, sports picture, autographed sports item, golf ball, soccer ball, baseball, a football, and basketball.

18. A sports shelf unit in accordance with claim 11 wherein:
said plastic shelf-supporting brackets have upper front corners defining inverted T-shaped bracket-slots; and
said bottom of said lower shelf portion defines recessed rearwardly diverging end channels in proximity to said side sections for sliding upon and wedgingly engaging said upper front corners of said plastic shelf-supporting brackets, said bottom of said lower shelf portion having rearwardly extending end-tongues positioned in said recessed rearwardly diverging end channels for interlockingly said inverted T-shaped bracket-slots to snap fit and connect said plastic platform comprising said lower shelf portion to said plastic shelf-supporting brackets.

19. A sports shelf unit in accordance with claim 11 wherein:
said sports indicia is selected from the group consisting of sports emblems, sports team logos, team names, illustrations of athletes, portraits of sports figures, graphical displays of sports subjects, and combination thereof; and
said wall member includes a back portion comprising a matrix of flanges providing a lattice infrastructure.

20. A sports shelf in accordance with claim 11 wherein:
said lower wall portion defines a substantially horizontal set of finger-receiving apertures; and
said plastic platform comprising said lower shelf portion has pairs of complementary hook-shaped fingers extending integrally rearwardly from said back section of said upright peripheral flange, said pairs of complementary hook-shaped fingers comprising flexible laterally biased hook-shaped fingers, said hook-shaped fingers being normally biased and urged laterally outwardly, and said hook-shaped fingers being moveable laterally inwardly towards a rearwardly converging position for interlockingly engaging said finger-receiving apertures to snap fit, wedge and securely connect said lower shelf portion to said lower wall portion.

* * * * *